(12) United States Patent
Noh et al.

(10) Patent No.: US 12,512,557 B2
(45) Date of Patent: Dec. 30, 2025

(54) SEPARATOR FOR LITHIUM SECONDARY BATTERY AND LITHIUM SECONDARY BATTERY INCLUDING THE SAME

(71) Applicant: LG ENERGY SOLUTION, LTD., Seoul (KR)

(72) Inventors: Seong-Hee Noh, Daejeon (KR); Su-Jin Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 693 days.

(21) Appl. No.: 17/923,145

(22) PCT Filed: Oct. 21, 2021

(86) PCT No.: PCT/KR2021/014863
§ 371 (c)(1),
(2) Date: Nov. 3, 2022

(87) PCT Pub. No.: WO2022/086246
PCT Pub. Date: Apr. 28, 2022

(65) Prior Publication Data
US 2023/0178853 A1   Jun. 8, 2023

(30) Foreign Application Priority Data
Oct. 21, 2020   (KR) .................. 10-2020-0137015

(51) Int. Cl.
*H01M 50/446* (2021.01)
*H01M 50/417* (2021.01)
(Continued)

(52) U.S. Cl.
CPC ....... *H01M 50/446* (2021.01); *H01M 50/417* (2021.01); *H01M 50/42* (2021.01); *H01M 50/449* (2021.01)

(58) Field of Classification Search
CPC ................................. H01M 50/446
See application file for complete search history.

(56) References Cited

U.S. PATENT DOCUMENTS

2013/0171500 A1   7/2013   Xu et al.
2015/0030933 A1   1/2015   Goetzen et al.
(Continued)

FOREIGN PATENT DOCUMENTS

CN   104115306 A   10/2014
CN   107851762 A   3/2018
(Continued)

OTHER PUBLICATIONS

International Search Report for PCT/KR2021/014863 (PCT/ISA/210) mailed on Feb. 7, 2022.
(Continued)

*Primary Examiner* — Stephan J Essex
(74) *Attorney, Agent, or Firm* — Birch, Stewart, Kolasch & Birch, LLP (57) ABSTRACT

A separator for a lithium secondary battery and a lithium secondary battery including the separator, including a porous polymer substrate; and a porous coating layer on at least one surface of the porous polymer substrate. The porous coating layer includes first inorganic particles surface-treated with a polyphenol-containing compound, second inorganic particles surface-treated with an organic acid, and a binder polymer. The first inorganic particles have an average particle diameter of 100 nm to 700 nm, and the second inorganic particles have an average particle diameter of 30 nm to 80 nm. The separator for a lithium secondary battery uses two types of surface-treated inorganic particles having a different average particle diameter. Therefore, the (Continued)

inorganic particles have improved dispersibility, and the separator has high thermal safety and can prevent separation of the inorganic particles.

17 Claims, 1 Drawing Sheet

(51) Int. Cl.
*H01M 50/42* (2021.01)
*H01M 50/449* (2021.01)

(56) References Cited

U.S. PATENT DOCUMENTS

| | | | | |
|---|---|---|---|---|
| 2016/0028067 | A1* | 1/2016 | Pekala | C08J 7/0423 156/247 |
| 2017/0098857 | A1 | 4/2017 | Carlson et al. | |
| 2018/0114968 | A1 | 4/2018 | Joo et al. | |
| 2018/0226624 | A1 | 8/2018 | Zhao et al. | |
| 2018/0277815 | A1 | 9/2018 | Sung et al. | |
| 2020/0194762 | A1 | 6/2020 | Kameda et al. | |
| 2020/0350546 | A1 | 11/2020 | Sung et al. | |
| 2022/0037739 | A1 | 2/2022 | Lee et al. | |
| 2022/0037741 | A1 | 2/2022 | Lee et al. | |
| 2022/0149480 | A1 | 5/2022 | Kwon et al. | |

FOREIGN PATENT DOCUMENTS

| | | |
|---|---|---|
| CN | 111180642 A | 5/2020 |
| CN | 111192998 A | 5/2020 |
| KR | 10-2013-0089454 A | 8/2013 |
| KR | 10-2013-0099463 A | 9/2013 |
| KR | 10-2013-0103946 A | 9/2013 |
| KR | 10-2013-0127201 A | 11/2013 |
| KR | 10-2014-0018171 A | 2/2014 |
| KR | 10-2014-0082378 A | 7/2014 |
| KR | 10-1465173 B1 | 11/2014 |
| KR | 10-2015-0051556 A | 5/2015 |
| KR | 10-2016-0118966 A | 10/2016 |
| KR | 10-2017-0084597 A | 7/2017 |
| KR | 10-2018-0042844 A | 4/2018 |
| KR | 10-2019-0139509 A | 12/2019 |
| KR | 10-2020-0006598 A | 1/2020 |
| KR | 10-2020-0051370 A | 5/2020 |
| KR | 10-2020-0078011 A | 7/2020 |
| KR | 10-2020-0079905 A | 7/2020 |
| KR | 10-2020-0112744 A | 10/2020 |

OTHER PUBLICATIONS

Extended European Search Report for European Application No. 21883314.3, dated Dec. 2, 2024.

* cited by examiner

SEPARATOR FOR LITHIUM SECONDARY BATTERY AND LITHIUM SECONDARY BATTERY INCLUDING THE SAME

TECHNICAL FIELD

The present application claims priority to Korean Patent Application No. 10-2020-0137015 filed on Oct. 21, 2020 in the Republic of Korea.

The present disclosure relates to a separator for a lithium secondary battery, and a lithium secondary battery including the same.

BACKGROUND ART

Recently, energy storage technology has been given an increasing attention. As the application of energy storage technology has been extended to energy for cellular phones, camcorders and notebook PC and even to energy for electric vehicles, there has been an increasing need for providing batteries used as power sources for such electronic devices with high energy density. Lithium secondary batteries are those satisfying such a need best. Therefore, active studies have been conducted about such lithium secondary batteries.

In the case of commercially available lithium secondary batteries, a polyolefin-based separator is used in order to prevent a short-circuit between a positive electrode and a negative electrode. However, such a separator generally uses a polymer ingredient molten at a temperature of 200° C. or lower, and is subjected to a stretching step for controlling the pore size and porosity so that it may be used as a separator, and thus is disadvantageous in that it undergoes heat shrinking to its original size upon the exposure to high temperature. Therefore, when the temperature of a battery is increased to high temperature due to internal/external stimuli, it is highly likely that the positive electrode and the negative electrode are in contact with each other due to the shrinking or melting of the separator to cause a short-circuit, resulting in rapid discharge of electric energy and ignition and explosion of the battery.

Therefore, a method for forming a porous coating layer containing inorganic particles mixed with a binder polymer on at least one surface of a porous polymer substrate, such as polyolefin, has been used widely to solve the above-mentioned problem.

However, the porous coating layer includes inorganic particles having a micrometer-scaled average particle diameter, and has a disadvantage in that it causes a significant increase in thickness of the separator, for example, an increase in thickness to 10 μm or more. Recently, as batteries have been provided with a light weight and small thickness, high-output high-capacity batteries are increasingly in demand. Under these circumstances, there have been increasing attempts to manufacture a separator having a smaller thickness, while ensuring thermal safety.

Therefore, a separator using inorganic particles having a nanometer-scaled average particle diameter, alone or in combination with inorganic particles having a different average particle diameter has been studied. However, in this case, such a small average particle dimeter of inorganic particles provides a high BET specific surface area and surface energy to cause the problem of easy aggregation of the inorganic particles in slurry for forming a porous coating layer.

In addition, the binder polymer are entangled on the surfaces of the inorganic particles having a nanometer-scaled average particle diameter and cannot be homogeneously distributed on the surfaces of the inorganic particles having a nanometer-scaled average particle diameter, thereby making it difficult to ensure the adhesion among the inorganic particles and/or the adhesion between the porous coating layer and the porous polymer substrate to cause the problem of easy separation of the inorganic particles.

As a result, there is still a need for technical development of a separator showing improved dispersibility of inorganic particles and capable of preventing separation of inorganic particles.

DISCLOSURE

Technical Problem

The present disclosure is designed to solve the problems of the related art, and therefore the present disclosure is directed to providing a separator for a lithium secondary battery which shows improved dispersibility of inorganic particles and can prevent separation of inorganic particles, even though it includes inorganic particles having a nanometer-scaled average particle diameter.

Technical Solution

In one aspect of the present disclosure, there is provided a separator for a lithium secondary battery according to any one of the following embodiments.

According to the first embodiment, there is provided a separator for a lithium secondary battery, including:

a porous polymer substrate; and a porous coating layer on at least one surface of the porous polymer substrate, wherein the porous coating layer includes first inorganic particles surface-treated with a polyphenol-containing compound, second inorganic particles surface-treated with an organic acid and a binder polymer, wherein the first inorganic particles have an average particle diameter of 100 nm to 700 nm, and the second inorganic particles have an average particle diameter of 30 nm to 80 nm.

According to the second embodiment, there is provided the separator for a lithium secondary battery as defined in the first embodiment, wherein the first inorganic particles may have an average particle diameter of 400-600 nm.

According to the third embodiment, there is provided the separator for a lithium secondary battery as defined in the first or the second embodiment, wherein the second inorganic particles may have an average particle diameter of 30-45 nm.

According to the fourth embodiment, there is provided the separator for a lithium secondary battery as defined in any one of the first to the third embodiments, wherein the second inorganic particles may have a zeta ($\zeta$) potential of −20 mV or less.

According to the fifth embodiment, there is provided the separator for a lithium secondary battery as defined in the fourth embodiment, wherein the zeta potential of the second inorganic particles may be as measured under an aqueous condition.

According to the sixth embodiment, there is provided the separator for a lithium secondary battery as defined in any one of the first to the fifth embodiments, wherein the polyphenol-containing compound may include tannic acid, polydopamine, catechin, resveratrol, quercetin, flavonoid, isoflavone, catechol, hydroquinone, resorcin, or two or more of them.

According to the seventh embodiment, there is provided the separator for a lithium secondary battery as defined in any one of the first to the sixth embodiments, wherein the organic acid may include sulfonic acid, carboxylic acid or a combination thereof.

According to the eighth embodiment, there is provided the separator for a lithium secondary battery as defined in the seventh embodiment, wherein the sulfonic acid may include benzenesulfonic acid, para-toluenesulfonic acid, or two or more of them.

According to the ninth embodiment, there is provided the separator for a lithium secondary battery as defined in the seventh embodiment, wherein the carboxylic acid may include acetic acid, propanoic acid, butyric acid, palmitic acid, lactic acid, tartaric acid, malic acid, glycolic acid, maleic acid, phthalic acid, succinic acid, arginine, glycine, glucuronic acid, gluconic acid, citric acid, or two or more of them.

According to the tenth embodiment, there is provided the separator for a lithium secondary battery as defined in any one of the first to the ninth embodiments, wherein the first inorganic particles may include $BaTiO_3$, $BaSO_4$, $Pb(Zr,Ti)O_3$ (PZT), $Pb_{1-x}La_xZr_{1-y}Ti_yO_3$ (PLZT, wherein $0<x<1$ and $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, $Mg(OH)_2$, NiO, CaO, ZnO, $ZrO_2$, $Y_2O_3$, $SiO_2$, $Al_2O_3$, AlOOH, $Al(OH)_3$, SiC, $TiO_2$, or two or more of them.

According to the eleventh embodiment, there is provided the separator for a lithium secondary battery as defined in any one of the first to the tenth embodiments, wherein the second inorganic particles may include $BaTiO_3$, $BaSO_4$, $Pb(Zr,Ti)O_3$ (PZT), $Pb_{1-x}La_xZr_{1-y}Ti_yO_3$ (PLZT, wherein $0<x<1$ and $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, $Mg(OH)_2$, NiO, CaO, ZnO, $ZrO_2$, $Y_2O_3$, $SiO_2$, $Al_2O_3$, AlOOH, $Al(OH)_3$, SiC, $TiO_2$, or two or more of them.

According to the twelfth embodiment, there is provided the separator for a lithium secondary battery as defined in any one of the first to the eleventh embodiments, wherein the weight ratio of the first inorganic particles to the second inorganic particles may be 90:10-40:60.

According to the thirteenth embodiment, there is provided the separator for a lithium secondary battery as defined in any one of the first to the twelfth embodiments, wherein the binder polymer may include polyvinylidene fluoride-co-hexafluoropropylene, polyvinylidene fluoride-co-trichloroethylene, acrylic polymer, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, carboxymethyl cellulose, acrylonitrile-styrene-butadiene copolymer, polyimide, or two or more of them.

According to the fourteenth embodiment, there is provided the separator for a lithium secondary battery as defined in any one of the first to the thirteenth embodiments, wherein the porous coating layer may have a packing density of 0.5-3.0 $g/cm^3$.

According to the fifteenth embodiment, there is provided the separator for a lithium secondary battery as defined in any one of the first to the fourteenth embodiments, which may have a heat shrinkage of 10% or less in each of the machine direction (MD) and the transverse direction (TD), after the separator is allowed to stand at 130° C. for 1 hour.

According to the sixteenth embodiment, there is provided the separator for a lithium secondary battery as defined in any one of the first to the fifteenth embodiments, wherein the peel strength between the porous polymer substrate and the porous coating layer may be 30 gf/15 mm or more.

In another aspect of the present disclosure, there is provided a lithium secondary battery according to the following embodiment.

According to the seventh embodiment, there is provided a lithium secondary battery including a positive electrode, a negative electrode and a separator interposed between the positive electrode and the negative electrode, wherein the separator is the separator for a lithium secondary battery as defined in any one of the first to the sixteenth embodiments.

Advantageous Effects

The separator for a lithium secondary battery according to an embodiment of the present disclosure includes two types of inorganic particles having a different average particle diameter, i.e. first inorganic particles having an average particle diameter of 100-700 nm and second inorganic particles having an average particle diameter of 30-80 nm, and thus shows a higher packing density as compared to the conventional separator for a lithium secondary battery having a micrometer-scaled average particle diameter and provides improved thermal safety.

In the separator for a lithium secondary battery according to an embodiment of the present disclosure, the first inorganic particles are surface-treated with a polyphenol-based composition, and thus the adhesion among the inorganic particles and/or the adhesion between the porous coating layer and the porous polymer substrate may be improved.

In addition, in the separator for a lithium secondary battery according to an embodiment of the present disclosure, the second inorganic particles are surface-treated with an organic acid, and thus the second inorganic particles having an average particle diameter of 30-80 nm may have improved dispersibility to prevent aggregation of the inorganic particles. Therefore, the separator for a lithium secondary battery according to an embodiment of the present disclosure shows high packing density and provides improved thermal safety.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the terms such as 'first', 'second', etc., are used for differentiate one constitutional element from another constitutional element, and each constitutional element is not limited to such terms.

In one aspect of the present disclosure, there is provided a separator for a lithium secondary battery, including:

a porous polymer substrate; and a porous coating layer disposed on at least one surface of the porous polymer substrate, and including first inorganic particles surface-treated with a polyphenol-based compound, second inorganic particles surface-treated with an organic acid and a binder polymer, wherein the first inorganic particles have an average particle diameter of 100-700 nm, and the second inorganic particles have an average particle diameter of 30-80 nm.

Figure 1:
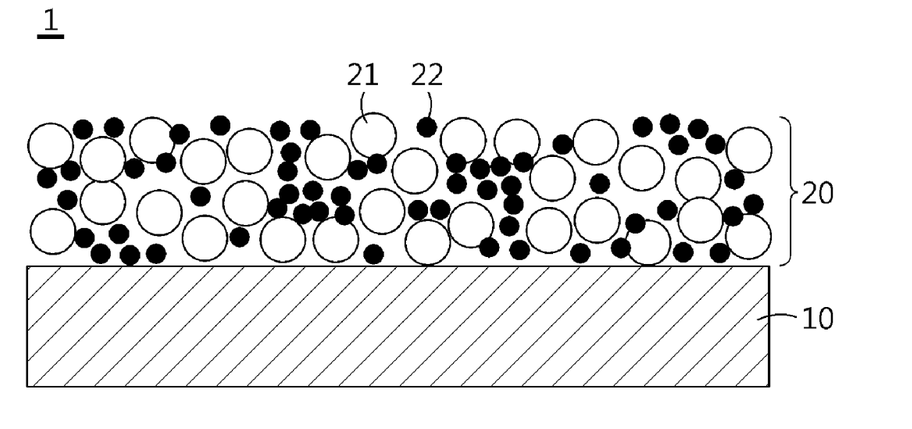
The Figure is a schematic view illustrating the separator for a lithium secondary battery according to an embodiment of the present disclosure.

The Figure is a schematic view illustrating the separator for a lithium secondary battery according to an embodiment of the present disclosure.

Referring to the Figure, the separator 1 for a lithium secondary battery includes a porous polymer substrate 10.

The porous polymer substrate 10 is not particularly limited, as long as it may be used generally as a material for a separator for a lithium secondary battery. The porous polymer substrate 10 may be a thin film including a polymeric material, and non-limiting examples of such a polymeric material include at least one selected from polymer resins, such as polyolefin resin, polyethylene terephthalate, polybutylene terephthalate, polyacetal, polyamide, polycarbonate, polyimide, polyetherether ketone, polyether sulfone, polyphenylene oxide, polyphenylene sulfide, and polyethylene naphthalene.

In addition, the porous polymer substrate 10 may include a non-woven web or a porous polymer film made of such a polymeric material, or a laminate of two or more layers thereof. Particularly, the porous polymer substrate 10 may be any one of the following a) to e):

a) A porous film formed by melting and extruding a polymer resin;

b) A multilayer film formed by stacking two or more layers of the porous films of a);

c) A non-woven web formed by integrating filaments obtained by melting/spinning a polymer resin;

d) A multilayer film formed by stacking two or more layers of the non-woven webs of c); and e) A porous composite film having a multilayer structure including two or more of a) to d).

According to an embodiment of the present disclosure, the porous polymer substrate may have a thickness of 1-50 μm, or 4-20 μm. The thickness of the porous polymer substrate 10 is not particularly limited to the above-defined range. However, when the porous polymer substrate satisfies the above-defined range of thickness, it is easier to ensure energy density, while preventing the separator from being damaged easily during the use of a battery.

Meanwhile, although there is no particular limitation in the pore size and porosity of the porous polymer substrate, the pore size and porosity may be 0.01-50 μm and 10-95%, respectively.

According to the present disclosure, the porosity and pore size of the porous polymer substrate may be determined from scanning electron microscopic (SEM) images, by using a mercury porosimeter or capillary flow porosimeter, or through the BET6-point method based on nitrogen gas adsorption flow using a porosimetry analyzer (e.g. Belsorp-II mini, Bell Japan Inc.). Herein, it may be advantageous to use a capillary flow porosimeter.

Referring to the Figure, the separator 1 for a lithium secondary battery includes a porous coating layer 20 on at least one surface of the porous polymer substrate 10. The porous coating layer 20 may be disposed on one surface or both surfaces of the porous polymer substrate 10.

Referring to the Figure, the porous coating layer 20 includes first inorganic particles 21 surface-treated with a polyphenol-based compound, second inorganic particles 22 surface-treated with an organic acid, and a binder polymer (not shown). The porous coating layer 20 prevents the porous polymer substrate 10 from undergoing a severe heat shrinking behavior at high temperature by virtue of the first inorganic particles 21 and the second inorganic particles 22, and thus can provide the separator with improved safety.

According to an embodiment of the present disclosure, in the porous coating layer 20, the first inorganic particles 21 and the second inorganic particles 22 may be bound to one another by the binder polymer, while they may be packed and be in contact with one another, thereby forming interstitial volumes among the inorganic particles, and the interstitial volumes among the inorganic particles may become vacant spaces to form pores.

The first inorganic particles 21 or the second inorganic particles 22 are not particularly limited, as long as they are electrochemically stable. In other words, the first inorganic particles or the second inorganic particles used herein are not particularly limited, as long as they cause no oxidation and/or reduction in the operating voltage range (e.g. 0-5 V based on Li/Li$^+$) of an applicable electrochemical device.

According to an embodiment of the present disclosure, the first inorganic particles 21 may be the same as or different from the second inorganic particles 22.

According to an embodiment of the present disclosure, the first inorganic particles 21 and/or the second inorganic particles 22 may include inorganic particles having a dielectric constant of 5 or more, or 10 or more, inorganic particles capable of transporting lithium ions and a mixture thereof. For example, the first inorganic particles 21 or the second inorganic particles 22 may include, but are not limited to: $BaTiO_3$, $BaSO_4$, $Pb(Zr,Ti)O_3$ (PZT), $Pb_{1-x}La_xZr_{1-y}Ti_yO_3$ (PLZT, wherein 0<x<1 and 0<y<1), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, $Mg(OH)_2$, NiO, CaO, ZnO, $ZrO_2$, $Y_2O_3$, $SiO_2$, $Al_2O_3$, γ-AlOOH, $Al(OH)_3$, SiC, $TiO_2$, or the like.

According to an embodiment of the present disclosure, the surface-treated first inorganic particles 21 have an average particle diameter of 100-700 nm. Since the separator according to an embodiment of the present disclosure includes the first inorganic particles 21, it may be formed to have a smaller thickness as compared to the conventional separator for a lithium secondary battery including the inorganic particles having micrometer-scaled average particle diameter. In addition, since the separator according to an embodiment of the present disclosure includes the first inorganic particles 21, the number of inorganic particles distributed per unit area of the separator is increased to realize high packing density, thereby providing improved thermal safety.

When the first inorganic particles 21 have an average particle diameter of less than 100 nm, the effect of improving packing density derived from the mixing with the second inorganic particles is degraded. When the first inorganic particles 21 have an average particle diameter of larger than 700 nm, it is not easy to manufacture a separator for a lithium secondary battery having a smaller thickness.

According to the present disclosure, the surface-treated second inorganic particles 22 have an average particle diameter of 30-80 nm. Since the separator according to an embodiment of the present disclosure includes the second inorganic particles 22 having a smaller average particle diameter than the average particle diameter of the first inorganic particles, the second inorganic particles 22 may be disposed in the large voids among the first inorganic particles 21 so that the porous coating layer 20 may have high packing density, and the number of inorganic particles distributed per unit area of the separator is increased so that the porous polymer substrate 10 may be inhibited from heat shrinking more effectively, thereby providing the separator with improved thermal safety as compared to the conventional separator for a lithium secondary battery.

When the second inorganic particles 22 have an average particle diameter of less than 30 nm, the second inorganic particles 22 blocks the pores of the separator, particularly the pores of the porous polymer substrate 10, to cause a decrease in air permeability and an increase in resistance. When the second inorganic particles 22 have an average particle diameter of larger than 80 nm, it is difficult to increase the packing density of the porous coating layer 20 and to improve the heat shrinkage of the separator.

According to an embodiment of the present disclosure, the first inorganic particles 21 may have an average particle diameter of 150-700 nm, 200-600 nm, or 400-600 nm. When the average particle diameter of the first inorganic particles 21 satisfies the above-defined range, the separator may have a smaller thickness as compared to the conventional separator for a lithium secondary battery, and the number of inorganic particles present per unit area of the separator is increased to realize high packing density, thereby facilitating improvement of the thermal safety.

According to an embodiment of the present disclosure, the second inorganic particles 22 may have an average particle diameter of 30-75 nm, 30-60 nm, or 30-45 nm. When the average particle diameter of the second inorganic particles 22 satisfies the above-defined range, the second inorganic particles 22 may be disposed in the large voids among the first inorganic particles 21 so that the porous coating layer 20 may have high packing density, and the thermal safety may be further improved.

As used herein, the term 'average particle diameter of the first inorganic particles 21' and 'average particle diameter of the second inorganic particles 22' means a D50 particle diameter, and 'D50 particle diameter' means a particle diameter at a point of 50% in the accumulated particle number distribution depending on particle diameter. The particle diameter may be determined by using a laser diffraction method. Particularly, powder to be analyzed is dispersed in a dispersion medium and introduced to a commercially available laser diffraction particle size analyzer (e.g. Microtrac S3500), and then a difference in diffraction pattern depending on particle size is determined, when particles pass through laser beams, and then particle size distribution is calculated. Then, the particle diameter at a point of 50% of the particle number accumulated distribution depending on particle diameter is calculated to determine D50.

According to the present disclosure, the first inorganic particles 21 are surface-treated with a polyphenol-based compound. When mixing the first inorganic particles 21 having an average particle diameter of 100-700 nm with the second inorganic particles 22 having an average particle diameter of 30-80 nm, the binder polymer is entangled with inorganic particles and it is difficult for the binder polymer to be distributed homogeneously. Therefore, it is difficult to form a homogeneous porous coating layer. In this case, the porous coating layer 20 may have a portion where the binder polymer is locally distributed non-homogeneously, and the adhesion between the porous coating layer 20 and the porous polymer substrate 10 may be reduced at this portion. In addition, since the binder polymer is locally distributed non-homogeneously as mentioned above, the first inorganic particles 21 or second inorganic particles 22 not surface coated with the binder polymer partially or totally may be present, thereby making it difficult to ensure the adhesion of the inorganic particles among themselves.

Since the separator 1 for a lithium secondary battery according to an embodiment of the present disclosure includes the first inorganic particles 21 surface-coated with a polyphenol functional group-containing material having adhesive property, the first inorganic particles 21 can supplement the function of the binder polymer to improve the adhesion between the porous coating layer 20 and the porous polymer substrate 10. In addition, the adhesion among the inorganic particles may be improved. In this manner, it is possible to prevent the inorganic particles from being separated from the porous polymer substrate.

According to an embodiment of the present disclosure, the polyphenol-based compound may include tannic acid, polydopamine, catechin, resveratrol, quercetin, flavonoid, isoflavone, catechol, hydroquinone, resorcin, or two or more of them In general, polydopamine refers to a polymer produced through the polymerization of a catechol amine, 3,4-dihydroxy-L-phenylalanine (DOPA). However, according to the present disclosure, polydopamine may include not only DOPA polymer but also any polydopamine prepared by modifying its functional group to meet desired properties without detracting from the objects of the present disclosure.

According to the present disclosure, the second inorganic particles 22 are surface-treated with an organic acid. Since the second inorganic particles 22 have an average particle diameter of 30-80 nm, they may be aggregated with ease. Therefore, the second inorganic particles 22 may have improved dispersibility through the surface treatment with an organic acid to prevent aggregation of the inorganic particles. When the dispersibility of the inorganic particles is improved, a homogeneous porous coating layer may be formed with ease, and the porous coating layer may have increased packing density, even though it includes the second inorganic particles 22 having an average particle diameter of 30-80 nm.

According to an embodiment of the present disclosure, the second inorganic particles 22 may have a zeta ($\zeta$) potential of −20 mV or less, −25 mV or less, −30 mV or less, or −40 to −60 mV. When the second inorganic particles 22 have the above-defined range of zeta potential, the second inorganic particles 22 may cause electrostatic repulsion among themselves to prevent aggregation of the inorganic particles.

According to an embodiment of the present disclosure, the zeta potential may be −20 mV or less at pH 5.0-8.0.

According to an embodiment of the present disclosure, the zeta potential of the second inorganic particles 22 may be determined under an aqueous condition. The aqueous condition refers to determination of the zeta potential in the presence of water, methanol, ethanol, propyl alcohol, butyl alcohol, butanediol, ethylene glycol, propylene glycol, tripropylene glycol, or two or more of them. Particularly, the zeta potential may be determined in the presence of water.

According to the present disclosure, 'zeta potential' is an index indicating a degree of surface charges of colloid particles floating in a liquid. When an electric filed is applied from the outside, colloid particles migrate in the direction opposite to the sign of the surface potential thereof, and the zeta potential is a value calculated from the particle migration rate at this time considering the intensity of the applied electric field and fluid mechanic effects (viscosity, dielectric constant, or the like of a dispersion medium). In other words, when the zeta potential has a larger negative value with a larger absolute value, the repulsion force among the second inorganic particles 22 is increased so that the inorganic particles may be dispersed better. On the other hand, when the zeta potential approaches 0, the inorganic particles may be aggregated more easily.

According to an embodiment of the present disclosure, the zeta potential may be determined by using a dynamic light scattering particle size analyzer. For example, after a sample is treated with ultrasonic waves, the zeta potential of the sample may be determined by using a dynamic light scattering particle size analyzer.

According to an embodiment of the present disclosure, the organic acid may include sulfonic acid. According to an embodiment of the present disclosure, the sulfonic acid may include an aliphatic sulfonic acid, an aromatic sulfonic acid, or two or more of them. The aromatic sulfonic acid may include benzenesulfonic acid, para-toluenesulfonic acid, or two or more of them. When the second inorganic particles 22 are surface-treated with benzenesulfonic acid or para-toluenesulfonic acid, the dispersibility of the second inorganic particles 22 may be further improved to prevent aggregation of the inorganic particles with ease.

According to another embodiment of the present disclosure, the organic acid may include carboxylic acid. According to an embodiment of the present disclosure, the carboxylic acid may include acetic acid, propanoic acid, butyric acid, palmitic acid, lactic acid, tartaric acid, malic acid, glycolic acid, maleic acid, phthalic acid, succinic acid, arginine, glycine, glucuronic acid, gluconic acid, citric acid, or two or more of them.

According to an embodiment of the present disclosure, the surface-treated first inorganic particles 21 may be composite particles having a core-shell structure, which includes a core portion including the first inorganic particles, and a polyphenol-based compound-containing coating layer formed on the surface of the core portion.

According to an embodiment of the present disclosure, the surface-treated second inorganic particles 22 may be composite particles having a core-shell structure, which includes a core portion including the second inorganic particles, and an organic acid-containing coating layer formed on the surface of the core portion.

According to an embodiment of the present disclosure, the binder polymer may include polyvinylidene fluoride-co-hexafluoropropylene, polyvinylidene fluoride-co-trichloroethylene, acrylic polymer, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalchol, cyanoethyl cellulose, cyanoethyl sucrose, pullulan, carboxymethyl cellulose, acrylonitrile-styrene-butadiene copolymer, polyimide, or two or more of them.

The weight ratio of the first inorganic particles 21 surface-treated with a polyphenol-based compound, the second inorganic particles 22 surface-treated with an organic acid and the binder polymer may be determined considering the thickness, pore size and porosity of the finished porous coating layer 20.

According to an embodiment of the present disclosure, the total content of the first inorganic particles 21 and the second inorganic particles 22 may be 10-99 wt % or 20-95 wt %, based on 100 wt % of the porous coating layer 20. When the total content of the first inorganic particles 21 and the second inorganic particles 22 falls within the above-defined range, the pore size and porosity of the porous coating layer 20 may be controlled to a suitable level, and the porous coating layer 20 may inhibit the separator from heat shrinking more effectively.

According to an embodiment of the present disclosure, the weight ratio of the first inorganic particles 21 to the second inorganic particles 22 may be 90:10-40:60, or 85:15-50:50. When the weight ratio of the first inorganic particles 21 to the second inorganic particles 22 satisfies the above-defined range, it is easier to minimize the voids among the inorganic particles and to increase the packing density of the porous coating layer 20, thereby providing an optimized effect of improving the thermal safety of the separator.

According to an embodiment of the present disclosure, the porous coating layer 20 may have a thickness of 300 nm to 10 μm, 400 nm to 7 μm, or 500 nm to 5 μm.

According to an embodiment of the present disclosure, the porous coating layer 20 may have pore size of 0.001 μm to 0.05 μm, or 0.001 μm to 0.03 μm.

In addition, the porous coating layer 20 may have a porosity of 20-80%, or 30-70%. When the porosity of the porous coating layer 20 falls within the above-defined range, it is easier to retain an electrolyte in an amount sufficient to operate a battery, and thus to ensure the mechanical strength of the separator, while not adversely affecting the charge/discharge characteristics of the battery. The porosity corresponds to a value obtained by subtracting the volume expressed from the weight and density of each ingredient in the porous coating layer 20, from the volume calculated from the thickness, width and length of the porous coating layer 20.

According to an embodiment of the present disclosure, the porosity and pore size of the porous coating layer 20 may be determined from scanning electron microscopic (SEM) images, by using a mercury porosimeter or capillary flow porosimeter, or through the BET6-point method based on nitrogen gas adsorption flow using a porosimetry analyzer (e.g. Belsorp-II mini, Bell Japan Inc.). Herein, it is advantageous to use a capillary flow porosimeter.

According to an embodiment of the present disclosure, the porous coating layer 20 may have a packing density of 0.5-3.0 g/cm$^3$, 0.7-2.5 g/cm$^3$, 1.0-2.0 g/cm$^3$, or 1.2-1.5 g/cm$^3$. When the packing density of the porous coating layer 20 satisfies the above-defined range, it is possible to further improve the thermal safety of the separator.

The packing density of the porous coating layer 20 may be calculated according to the following Formula 1:

Packing density=Loading amount/Coating layer thickness [Formula 1]

According to an embodiment of the present disclosure, the separator for a lithium secondary battery may show a heat shrinkage of 10% or less, 2-10%, 5% or less, or 2-5% in each of the machine direction (MD) and the transverse direction (TD), after it is allowed to stand at 130° C. for 1 hour.

Throughout the specification, 'machine direction' refers to the direction of progress during the continuous production of a separator, i.e. the longitudinal direction of the separator, while 'transverse direction' refers to the transverse direction to the machine direction, i.e. the direction perpendicular to the direction of progress during the continuous production of a separator, i.e. the direction perpendicular to the longitudinal direction of the separator.

According to an embodiment of the present disclosure, the peel strength between the porous polymer substrate and the porous coating layer may be 30 gf/15 mm or more, 35 gf/15 mm or more, 40 gf/15 mm or more, 50 gf/15 mm or more, or 55 gf/15 mm or more.

The peel strength between the porous polymer substrate and the porous coating layer may be determined by adhering the separator onto slide glass in such a manner that a double-sided tape may face the porous coating layer, and then measuring the peel force required for separating the separator from the tape.

The separator for a lithium secondary battery according to an embodiment of the present disclosure may be obtained by the following method but is not limited thereto.

The separator for a lithium secondary battery according to an embodiment of the present disclosure may be obtained from the method including the steps of:
    treating the surfaces of first inorganic particles with a polyphenol-based compound;
    treating the surfaces of second inorganic particles with an organic acid; and
    coating slurry containing the first inorganic particles surface-treated with a polyphenol-based compound, the second inorganic particles surface-treated with an organic acid, a binder polymer and a solvent for the binder polymer on at least one surface of a porous polymer substrate, followed by drying, to form a porous coating layer.

Hereinafter, the method will be described in more detail about the main parts thereof.

First, the first inorganic particles are surface-treated with a polyphenol-based compound.

Reference will be made to the above description about the average particle diameter and types of the first inorganic particles and the polyphenol-based compound.

After adding the polyphenol-based compound to a solution containing the first inorganic particles dispersed therein, the resultant mixture may be dried to modify the surfaces of the first inorganic particles.

According to an embodiment of the present disclosure, the solution containing the first inorganic particles dispersed therein may include the first inorganic particles dispersed in the solution in a colloidal state. The first inorganic particles may be added after they are pulverized in advance to a predetermined average particle diameter. Otherwise, the first inorganic particles may be added, and then pulverized and dispersed while controlling them to have a predetermined average particle diameter by using a ball milling process, or the like.

According to an embodiment of the present disclosure, the solution containing the first inorganic particles dispersed therein may include an aqueous solvent. The aqueous solvent may include water, methanol, ethanol, propyl alcohol, butyl alcohol, butanediol, ethylene glycol, propylene glycol, tripropylene glycol, or two or more of them.

According to an embodiment of the present disclosure, the polyphenol-based compound may be added in an amount of 0.01-30 parts by weight, 0.05-25 parts by weight, or 0.07-20 parts by weight, based on 100 parts by weight of the solution containing the first inorganic particles dispersed therein. When the polyphenol-based compound is added within the above-defined range, polyphenol functional groups may be formed sufficiently on the surfaces of the first inorganic particles, and thus the adhesion of the first inorganic particles may be improved.

According to an embodiment of the present disclosure, the first inorganic particles may be surface-modified at a temperature of 20-90° C., or 25-80° C. When the surface modification temperature of the first inorganic particles satisfies the above-defined temperature, the first inorganic particles may be surface-modified effectively.

Next, the second inorganic particles are surface-treated with an organic acid. Herein, it is stated that the second inorganic particles are surface-modified after the first inorganic particles are surface-modified. However, the step of treating the surfaces of the second inorganic particles may be carried out before the step of modifying the surfaces of the first inorganic particles with a polyphenol compound, or simultaneously with the step of modifying the surfaces of the first inorganic particles with a polyphenol compound.

Reference will be made to the above description about the average particle diameter and types of the second inorganic particles and the organic acid.

After adding the organic acid to a solution containing the second inorganic particles dispersed therein, the resultant mixture may be dried to modify the surfaces of the second inorganic particles.

According to an embodiment of the present disclosure, the solution containing the second inorganic particles dispersed therein may include the second inorganic particles dispersed in the solution in a colloidal state. The second inorganic particles may be added after they are pulverized in advance to a predetermined average particle diameter. Otherwise, the second inorganic particles may be added, and then pulverized and dispersed while controlling them to have a predetermined average particle diameter by using a ball milling process, or the like.

According to an embodiment of the present disclosure, the solution containing the second inorganic particles dispersed therein may include an aqueous solvent. The aqueous solvent may include water, methanol, ethanol, propyl alcohol, butyl alcohol, butanediol, ethylene glycol, propylene glycol, tripropylene glycol, or two or more of them.

According to an embodiment of the present disclosure, the organic acid may be added in an amount of 0.01-30 parts by weight, or 0.1-20 parts by weight, based on 100 parts by weight of the solution containing the second inorganic particles dispersed therein. When the organic acid is added within the above-defined range, the dispersibility of the second inorganic particles may be further improved. For example, it is possible to maximize the negative value of zeta potential, to further increase the repulsion among the second inorganic particles, and to further improve the dispersibility of the second inorganic particles.

According to an embodiment of the present disclosure, the second inorganic particles may be surface-modified at a temperature of 20-90° C., or 25-80° C. When the surface modification temperature of the second inorganic particles satisfies the above-defined temperature, the second inorganic particles may be surface-modified effectively.

According to an embodiment of the present disclosure, the method for drying the surface-treated first inorganic particles and the surface-treated second inorganic particles may be carried out by using a conventional method known to those skilled in the art.

According to the present disclosure, the first inorganic particles surface-treated with a polyphenol-based compound in the slurry for forming a porous coating layer have improved adhesion to prevent the inorganic particles from being separated from the porous polymer substrate. The second inorganic particles surface-treated with an organic acid have improved dispersibility to prevent precipitation or aggregation thereof in the slurry. In this manner, it is possible to improve the coatability of the slurry, and to increase the packing density of the porous coating layer contained in the finished separator.

Then, the slurry containing the first inorganic particles surface-treated with a polyphenol compound, the second inorganic particles surface-treated with an organic acid, a binder polymer and a solvent for the binder polymer is coated on at least one surface of the porous polymer substrate, followed by drying.

Reference will be made to the above description about the binder polymer.

Reference will be made to the above description about the content of each of the first inorganic particles, the second inorganic particles and the binder polymer.

According to the present disclosure, the solvent for the binder polymer may function as a solvent capable of dissolving the binder polymer, or as a dispersion medium not capable of dissolving the binder polymer but capable of dispersing the binder polymer, depending on the particular type of the binder polymer.

According to an embodiment of the present disclosure, the solvent for the binder polymer may include an organic solvent, such as N-methyl-2-pyrrolidone (NMP), acetone, dimethyl acetamide (DMAc) or dimethyl sulfoxide (DMSO), or water.

Even though the slurry includes the first and the second inorganic particles having a significantly small average particle diameter, the second inorganic particles are surface-treated with an organic acid, and thus the dispersibility of the inorganic particles in the slurry may be improved. Therefore, it is possible to form a uniform porous coating layer containing the inorganic particles.

Although there is no particular limitation in the process for coating the slurry onto the porous polymer substrate, a slot coating or dip coating process may be used. A slot coating process includes coating a composition supplied through a slot die onto the whole surface of a substrate and is capable of controlling the thickness of a coating layer depending on the flux supplied from a metering pump. In addition, a dip coating process includes dipping a substrate into a tank containing a composition to carry out coating and is capable of controlling the thickness of a coating layer depending on the concentration of the composition and the rate of removing the substrate from the tank. Further, in order to control the coating thickness more precisely, it is possible to carry out post-metering through a Mayer bar or the like, after dipping.

The porous polymer substrate coated with the slurry may be dried by using a conventional drying method used for manufacturing a separator.

The separator for a lithium secondary battery according to an embodiment of the present disclosure may be interposed between a positive electrode and a negative electrode to provide a lithium secondary battery. The lithium secondary battery may include a lithium metal secondary battery, a lithium-ion secondary battery, a lithium polymer secondary battery or a lithium-ion polymer secondary battery.

The electrodes used in combination with the separator according to the present disclosure are not particularly limited, and may be obtained by allowing electrode active materials to be bound to an electrode current collector through a method generally known in the art.

Among the electrode active materials, non-limiting examples of a positive electrode active material include conventional positive electrode active materials that may be used for the positive electrodes for conventional electrochemical devices. Particularly, lithium manganese oxides, lithium cobalt oxides, lithium nickel oxides, lithium iron oxides or lithium composite oxides containing a combination thereof are used preferably.

Non-limiting examples of a negative electrode active material include conventional negative electrode active materials that may be used for the negative electrodes for conventional electrochemical devices. Particularly, lithium-intercalating materials, such as lithium metal or lithium alloys, carbon, petroleum coke, activated carbon, graphite or other carbonaceous materials, are used preferably.

Non-limiting examples of a positive electrode current collector include foil made of aluminum, nickel or a combination thereof. Non-limiting examples of a negative electrode current collector include foil made of copper, gold, nickel, copper alloys or a combination thereof.

According to an embodiment of the present disclosure, the electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

According to an embodiment of the present disclosure, the separator for a lithium secondary battery may be applied to a battery through lamination, stacking and folding of the separator with electrodes, besides a conventional process, winding.

According to an embodiment of the present disclosure, the separator for a lithium secondary battery may be interposed between the positive electrode and the negative electrode. When an electrode assembly is formed by assembling a plurality of cells or electrodes, the separator may be interposed between the adjacent cells or electrodes. The electrode assembly may have various structures, such as a simple stack type, a jelly-roll type, a stacked-folded type, a laminated-stacked type, or the like.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, 30 mg of Al(OH)$_3$ (available from KC corporation, average particle diameter: 560 nm) as first inorganic particles was dispersed in 100 g of water, 15 g of tannic acid (available from Sigma-Aldrich) was added thereto, and the resultant mixture was agitated at room temperature (25° C.) for 24 hours. The first inorganic particles were washed with water several times and vacuum dried at 80° C. to obtain the first inorganic particles surface-treated with tannic acid.

Next, 10 g of AlOOH (available from Sasol, average particle diameter: 40 nm) as second inorganic particles was dispersed in 100 g of water, 3 g of para-toluenesulfonic acid (available from Sigma-Aldrich) was added thereto, and the resultant mixture was agitated at 80° C. for 2 hours. The second inorganic particles were washed with water and vacuum dried at 80° C. to obtain the second inorganic particles surface-treated with an organic acid.

Then, 24 g of the first inorganic particles were dispersed in 70 g of water, 6 g of the second inorganic particles were added thereto, and the resultant mixture was agitated for 30 minutes. After that, 4 g of a polymethacrylate-based dispersant was added to the slurry and dispersed therein by ball milling for 2 hours. Then, 4 g of an acrylic polymer binder (available from Toyochem) was added thereto to obtain slurry.

The resultant slurry was coated on one surface of a polyethylene porous substrate having a thickness of 10 μm through bar coating to obtain a separator including a porous coating layer on one surface thereof.

Example 2

First, 1.5 g of 3,4-dihydroxy-L-phenylalanine (DOPA) was added to and dispersed in a solution containing 500 mL of ethanol and 500 mL of a buffer solution. Next, 30 g of Al(OH)$_3$ (available from KC corporation, average particle diameter: 560 nm) as first inorganic particles was added thereto, the resultant mixture was agitated for 24 hours to perform crosslinking of dopamine, and the resultant product was washed with water several times to obtain the first inorganic particles surface-treated with polydopamine.

Then, a separator was obtained in the same manner as Example 1.

Example 3

A separator was obtained in the same manner as Example 1, except that of AlOOH (available from Sasol, average particle diameter: 40 nm) surface-treated with citric acid was used as the second inorganic particles.

Comparative Example 1

First, 30 g of Al(OH)$_3$ (available from KC corporation, average particle diameter: 560 nm) and 3 g of a polymethacrylate-based dispersant were added to 70 g of water and dispersed therein by ball milling for 2 hours. Then, 4 g of an acrylic polymer binder (available from Toyochem) was added thereto to obtain slurry.

The resultant slurry was coated on one surface of a polyethylene porous substrate having a thickness of 10 μm through bar coating to obtain a separator including a porous coating layer on one surface thereof.

Comparative Example 2

A separator was obtained in the same manner as Example 1, except that Al(OH)$_3$ (available from KC corporation) having an average particle diameter of 810 nm was used as the first inorganic particles.

Comparative Example 3

A separator was obtained in the same manner as Example 1, except that AlOOH (available from Nabaltec) having an average particle diameter of 200 nm was used as the second inorganic particles.

Comparative Example 4

A separator was obtained in the same manner as Example 1, except that non-surface treated Al(OH)$_3$ (available from KC corporation) having an average particle diameter of 560 nm was used as the first inorganic particles.

Comparative Example 5

A separator was obtained in the same manner as Example 1, except that non-surface treated AlOOH (available from Sasol) having an average particle diameter of 70 nm was used as the second inorganic particles.

Test Example 1: Comparison of Physical Properties of Separators According to Examples 1-3 and Comparative Examples 1-5

The physical properties of the separators obtained according to Examples 1-3 and Comparative Examples 1-5 were determined. The results are shown in the following Table 1.

The test methods are as follows.

Determination of Zeta Potential of Second Inorganic Particles

Each of the second inorganic particle samples used in Examples 1-3 and Comparative Examples 1-5 was added to water and subjected to ultrasonication for 5 minutes. Then, the zeta potential value of the second inorganic particles was determined by using a dynamic light scattering particle size analyzer (ELSZ-2, manufactured by OTSUKA ELECTRONICS CO., LTD).

Determination of Packing Density of Porous Coating Layer

The packing density of the porous coating layer of each of the separators according to Examples 1-3 and Comparative Examples 1-5 was calculated by using the following Formula 1:

Packing density=Loading amount/Coating layer thickness [Formula 1]

Determination of Heat Shrinkage

Each of the separators according to Examples 1-3 and Comparative Examples 1-5 was cut into a size of width (MD) 5 cm×length (TD) 5 cm to prepare a sample. Each sample was stored in an oven at 130° C., and the heat shrinkage of each sample was calculated in the machine direction (MD) and the transverse direction (TD).

Determination of Peel Strength Between Porous Polymer Substrate and Porous Coating Layer Each of the separators according to Examples 1-3 and Comparative Examples 1-5 was cut into a width of 2.5 cm, and adhered to slide glass by using a double-sided tape in such a manner that the double-sided tape might face the porous coating layer. Then, the peel force required for separating the tape and the separator from each other was determined to predict the adhesion between the porous coating layer and the porous polymer substrate.

a lower packing density and the separator provides lower quality in terms of heat shrinkage at 130° C., as compared to Examples 1-3. In addition, the first inorganic particles have an average particle diameter of larger than 700 nm, and the number of inorganic particles distributed per unit area of the separator is small. Therefore, despite the surface treatment of the first inorganic particles with a polyphenol-based compound, the separator shows a low peel strength between the porous coating layer and the porous polymer substrate.

TABLE 1

| | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|
| Average particle diameter of first inorganic particles (nm) | 560 | 560 | 560 | 560 | 810 | 560 | 560 | 560 |
| Average particle diameter of second inorganic particles (nm) | 40 | 40 | 40 | — | 40 | 200 | 40 | 70 |
| Surface treating agent for first inorganic particles | Tannic acid | Polydopamine | Tannic acid | — | Tannic acid | Tannic acid | — | Tannic acid |
| Surface treating agent for second inorganic particles | Para-toluene sulfonic acid | Para-toluene sulfonic acid | Citric acid | — | Para-toluene sulfonic acid | Para-toluene sulfonic acid | Para-toluene sulfonic acid | — |
| Zeta potential value of second inorganic particles (mV) | −55 | −55 | −47 | — | −55 | −15 | −55 | 44 |
| Packing density of porous coating layer (g/cm$^3$) | 1.3 | 1.3 | 1.2 | 0.9 | 1.1 | 1.0 | 1.2 | 1.1 |
| Heat shrinkage at 130° C.    MD | 2 | 4 | 5 | 12 | 12 | 11 | 6 | 11 |
| Heat shrinkage at 130° C.    TD | 2 | 3 | 5 | 11 | 10 | 11 | 6 | 12 |
| Peel strength between porous coating layer and porous polymer substrate (gf/15 mm) | 42 | 56 | 35 | 10 | 28 | 30 | 12 | 32 |

As can be seen from Table 1, the separator for a lithium secondary battery including the first inorganic particles having an average particle diameter of 100-700 nm and surface-treated with a polyphenol-based compound according to each of Examples 1-3 shows a high peel strength between the porous coating layer and the porous polymer substrate. In addition, it can be seen that even though the separator for a lithium secondary battery according to each of Examples 1-3 includes the first inorganic particles having an average particle diameter of 100-700 nm and the second inorganic particles having an average particle diameter of 30-80 nm, the second inorganic particles are surface-treated with an organic acid and have improved dispersibility, and thus the porous coating layer shows an increase in packing density to provide high quality in terms of heat shrinkage at 130° C.

On the contrary, it can be seen that the separator for a lithium secondary battery according to Comparative Example 1 uses merely one type of inorganic particles, and thus the porous coating layer shows a lower packing density and the separator provides lower quality in terms of heat shrinkage at 130° C., as compared to Examples 1-3. It can be also seen that since the inorganic particles are not surface-treated with a polyphenol-based compound, the separator shows a low peel strength between the porous coating layer and the porous polymer substrate.

It can be seen that the separator for a lithium secondary battery according to Comparative Example 2 uses the first inorganic particles having an average particle diameter of larger than 700 nm, and thus the porous coating layer shows It can be seen that the separator for a lithium secondary battery according to Comparative Example 3 uses the second inorganic particles having an average particle diameter of larger than 80 nm, and thus the porous coating layer shows a lower packing density and the separator provides lower quality in terms of heat shrinkage at 130° C., as compared to Examples 1-3.

It can be seen that the separator for a lithium secondary battery according to Comparative Example 4 uses the first inorganic particles not surface-treated with a polyphenol-based compound, and thus the porous coating layer is separated from the porous polymer substrate with ease.

It can be seen that the separator for a lithium secondary battery according to Comparative Example 5 uses the second inorganic particles not surface-treated with an organic acid, and thus the inorganic particles are aggregated with ease, and a homogeneous porous coating layer is not formed. Therefore, despite the use of the inorganic particles having the same average particle diameter as Examples 1-3, the porous coating layer shows a lower packing density, and the separator provides lower quality in terms of heat shrinkage at 130° C.

What is claimed is:

1. A separator for a lithium secondary battery, comprising:
a porous polymer substrate; and
a porous coating layer on at least one surface of the porous polymer substrate,
wherein the porous coating layer comprises first inorganic particles surface-treated with a polyphenol-containing compound, second inorganic particles surface-treated with an organic acid, and a binder polymer,
wherein the first inorganic particles have an average particle diameter of 100 nm to 700 nm, and
wherein the second inorganic particles have an average particle diameter of 30 nm to 80 nm.

2. The separator for the lithium secondary battery according to claim 1, wherein the average particle diameter of the first inorganic particles ranges from 400 nm to 600 nm.

3. The separator for the lithium secondary battery according to claim 1, wherein the average particle diameter of the second inorganic particles ranges from 30 nm to 45 nm.

4. The separator for the lithium secondary battery according to claim 1, wherein the second inorganic particles have a zeta ($\zeta$) potential of −20 mV or less.

5. The separator for the lithium secondary battery according to claim 4, wherein the zeta potential of the second inorganic particles is as measured under an aqueous condition.

6. The separator for the lithium secondary battery according to claim 1, wherein the polyphenol-containing compound comprises at least one of tannic acid, polydopamine, catechin, resveratrol, quercetin, flavonoid, isoflavone, catechol, hydroquinone, or resorcin.

7. The separator for the lithium secondary battery according to claim 1, wherein the organic acid comprises at least one of sulfonic acid, or carboxylic acid.

8. The separator for the lithium secondary battery according to claim 7, wherein the sulfonic acid comprises at least one of benzenesulfonic acid, or para-toluenesulfonic acid.

9. The separator for the lithium secondary battery according to claim 7, wherein the carboxylic acid comprises at least one of acetic acid, propanoic acid, butyric acid, palmitic acid, lactic acid, tartaric acid, malic acid, glycolic acid, maleic acid, phthalic acid, succinic acid, arginine, glycine, glucuronic acid, gluconic acid, or citric acid.

10. The separator for the lithium secondary battery according to claim 1, wherein the first inorganic particles comprise at least one of $BaTiO_3$, $BaSO_4$, $Pb(Zr,Ti)O_3$ (PZT), $Pb_{1-x}La_xZr_{1-y}Ti_yO_3$ (PLZT, wherein 0<x<1 and 0<y<1), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, $Mg(OH)_2$, NiO, CaO, ZnO, $ZrO_2$, $Y_2O_3$, $SiO_2$, $Al_2O_3$, AlOOH, $Al(OH)_3$, SiC, or $TiO_2$.

11. The separator for the lithium secondary battery according to claim 1, wherein the second inorganic particles comprise at least one of $BaTiO_3$, $BaSO_4$, $Pb(Zr,Ti)O_3$ (PZT), $Pb_{1-x}La_xZr_{1-y}Ti_yO_3$ (PLZT, wherein 0<x<1 and 0<y<1), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, $Mg(OH)_2$, NiO, CaO, ZnO, $ZrO_2$, $Y_2O_3$, $SiO_2$, $Al_2O_3$, AlOOH, $Al(OH)_3$, SiC, or $TiO_2$.

12. The separator for the lithium secondary battery according to claim 1, wherein a weight ratio of the first inorganic particles to the second inorganic particles is from 90:10 to 40:60.

13. The separator for the lithium secondary battery according to claim 1, wherein the binder polymer comprises at least one of polyvinylidene fluoride-co-hexafluoropropylene, polyvinylidene fluoride-co-trichloroethylene, acrylic polymer, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, carboxymethyl cellulose, acrylonitrile-styrene-butadiene copolymer, or polyimide.

14. The separator for the lithium secondary battery according to claim 1, wherein the porous coating layer has a packing density of 0.5 to 3.0 g/cm$^3$.

15. The separator for the lithium secondary battery according to claim 1, which has a heat shrinkage of 10% or less in each of a machine direction (MD) and a transverse direction (TD), after the separator is allowed to stand at 130° C. for 1 hour.

16. The separator for the lithium secondary battery according to claim 1, wherein a peel strength between the porous polymer substrate and the porous coating layer is 30 gf/15 mm or more.

17. A lithium secondary battery, comprising:
a positive electrode,
a negative electrode, and
a separator interposed between the positive electrode and the negative electrode,
wherein the separator is the separator for the lithium secondary battery as defined in claim 1.

* * * * *